US008520561B2

(12) United States Patent
Nguyen et al.

(10) Patent No.: US 8,520,561 B2
(45) Date of Patent: Aug. 27, 2013

(54) SYSTEMS, METHODS AND NETWORK COMPONENTS THAT PROVIDE DIFFERENT SATELLITE SPOT BEAM RETURN CARRIER GROUPINGS AND REUSE PATTERNS

(75) Inventors: Serge Nguyen, Farfax Station, VA (US); Santanu Dutta, Vienna, VA (US)

(73) Assignee: ATC Technologies, LLC, Reston, VA (US)

( * ) Notice: Subject to any disclaimer, the term of this patent is extended or adjusted under 35 U.S.C. 154(b) by 482 days.

(21) Appl. No.: 12/699,466

(22) Filed: Feb. 3, 2010

(65) Prior Publication Data

US 2010/0309828 A1  Dec. 9, 2010

Related U.S. Application Data

(60) Provisional application No. 61/185,246, filed on Jun. 9, 2009.

(51) Int. Cl.
*H04J 1/00* (2006.01)
(52) U.S. Cl.
USPC .......................... 370/281; 370/316; 455/12.1
(58) Field of Classification Search
None
See application file for complete search history.

(56) References Cited

U.S. PATENT DOCUMENTS

| | | | |
|---|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |

(Continued)

FOREIGN PATENT DOCUMENTS

| | | |
|---|---|---|
| EP | 0 506 255 A2 | 9/1992 |
| EP | 0 506 255 A3 | 9/1992 |

(Continued)

OTHER PUBLICATIONS

International Search Report and Written Opinion of the International Searching Authority for International application No. PCT/US2010/036102, Date of Mailing: Apr. 6, 2011; 18 pages.

(Continued)

*Primary Examiner* — Kwang B Yao
*Assistant Examiner* — Leon Andrews
(74) *Attorney, Agent, or Firm* — Myers Bigel Sibley & Sajovec, P.A.

(57) ABSTRACT

In some embodiments, a satellite communications network dynamically regulates carrier assignment for bidirectional communications between a satellite and radioterminals. The satellite communications network includes a resource manager that regulates the carrier assignments by selecting among a plurality of FDD return subcarriers, with potentially different subcarrier bandwidths and supporting different radio access technologies, within at least one FDD return carrier grouping for coupling to a selected one of a plurality of FDD forward carriers, and by controlling the satellite network to receive communications from the radioterminal on the selected FDD return subcarrier and to transmit communications to the radioterminal on the selected FDD forward carrier.

42 Claims, 4 Drawing Sheets

(56) References Cited

U.S. PATENT DOCUMENTS

| | | |
|---|---|---|
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,418,147 B1 | 7/2002 | Wiedeman |
| 6,449,461 B1 | 9/2002 | Otten |
| 6,522,865 B1 | 2/2003 | Otten |
| 6,628,919 B1 | 9/2003 | Curello et al. |
| 6,650,868 B1 | 11/2003 | Karabinis |
| 6,684,057 B2 | 1/2004 | Karabinis |
| 6,735,437 B2 | 5/2004 | Mayfield et al. |
| 6,775,251 B1 | 8/2004 | Wiedeman et al. |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,917,580 B2 | 7/2005 | Wang et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,092,708 B2 | 8/2006 | Karabinis |
| 7,113,743 B2 | 9/2006 | Karabinis |
| 7,113,778 B2 | 9/2006 | Karabinis |
| 7,149,526 B2 | 12/2006 | Karabinis et al. |
| 7,155,340 B2 | 12/2006 | Churan |
| 7,174,127 B2 | 2/2007 | Otten et al. |
| 7,181,161 B2 | 2/2007 | Karabinis |
| 7,203,490 B2 | 4/2007 | Karabinis |
| 7,218,931 B2 | 5/2007 | Karabinis |
| 7,295,807 B2 | 11/2007 | Karabinis |
| 7,340,213 B2 | 3/2008 | Karabinis et al. |
| 7,418,236 B2 | 8/2008 | Levin et al. |
| 7,418,263 B2 | 8/2008 | Dutta et al. |
| 7,421,342 B2 | 9/2008 | Churan |
| 7,437,123 B2 | 10/2008 | Karabinis et al. |
| 7,444,170 B2 | 10/2008 | Karabinis |
| 7,447,501 B2 | 11/2008 | Karabinis |
| 7,453,396 B2 | 11/2008 | Levin et al. |
| 7,453,920 B2 | 11/2008 | Churan |
| 7,454,175 B2 | 11/2008 | Karabinis |
| 7,457,269 B1 | 11/2008 | Grayson |
| 7,558,568 B2 | 7/2009 | Karabinis |
| 7,574,206 B2 | 8/2009 | Karabinis |
| 7,577,400 B2 | 8/2009 | Karabinis et al. |
| 7,587,171 B2 | 9/2009 | Evans et al. |
| 7,593,691 B2 | 9/2009 | Karabinis |
| 7,593,724 B2 | 9/2009 | Karabinis |
| 7,593,725 B2 | 9/2009 | Karabinis |
| 7,593,726 B2 | 9/2009 | Karabinis et al. |
| 7,596,111 B2 | 9/2009 | Karabinis |
| 7,599,656 B2 | 10/2009 | Karabinis |
| 7,603,081 B2 | 10/2009 | Karabinis |
| 7,603,117 B2 | 10/2009 | Karabinis |
| 7,606,590 B2 | 10/2009 | Karabinis |
| 7,609,666 B2 | 10/2009 | Karabinis |
| 7,620,394 B2 | 11/2009 | Good et al. |
| 7,623,859 B2 | 11/2009 | Karabinis |
| 7,623,867 B2 | 11/2009 | Karabinis |
| 7,627,285 B2 | 12/2009 | Karabinis |
| 7,634,229 B2 | 12/2009 | Karabinis |
| 7,634,234 B2 | 12/2009 | Karabinis |
| 7,636,546 B2 | 12/2009 | Karabinis |
| 7,636,566 B2 | 12/2009 | Karabinis |
| 7,636,567 B2 | 12/2009 | Karabinis et al. |
| 7,639,981 B2 | 12/2009 | Karabinis |
| 7,653,348 B2 | 1/2010 | Karabinis |
| 7,664,460 B2 | 2/2010 | Karabinis et al. |
| 7,696,924 B2 | 4/2010 | Levin et al. |
| 7,706,746 B2 | 4/2010 | Karabinis et al. |
| 7,706,748 B2 | 4/2010 | Dutta |
| 7,706,826 B2 | 4/2010 | Karabinis |
| 7,738,837 B2 | 6/2010 | Karabinis |
| 7,747,229 B2 | 6/2010 | Dutta |
| 7,751,823 B2 | 7/2010 | Karabinis |
| 7,756,490 B2 | 7/2010 | Karabinis |
| 7,783,287 B2 | 8/2010 | Karabinis |
| 7,792,069 B2 | 9/2010 | Karabinis |
| 7,792,488 B2 | 9/2010 | Karabinis et al. |
| 7,796,985 B2 | 9/2010 | Karabinis |
| 7,796,986 B2 | 9/2010 | Karabinis |
| 7,801,520 B2 | 9/2010 | Karabinis |
| 7,813,700 B2 | 10/2010 | Zheng et al. |
| 7,817,967 B2 | 10/2010 | Karabinis et al. |
| 7,831,201 B2 | 11/2010 | Karabinis |
| 7,831,202 B2 | 11/2010 | Karabinis |
| 7,831,251 B2 | 11/2010 | Karabinis et al. |
| 7,856,211 B2 | 12/2010 | Karabinis |
| 8,160,034 B1 * | 4/2012 | Sarkar et al. .................. 370/336 |
| 2002/0122408 A1 | 9/2002 | Mullins |
| 2002/0146979 A1 | 10/2002 | Regulinski et al. |
| 2002/0154620 A1 * | 10/2002 | Azenkot et al. ............... 370/347 |
| 2002/0177465 A1 | 11/2002 | Robinett |
| 2003/0003815 A1 | 1/2003 | Yamada |
| 2003/0149986 A1 | 8/2003 | Mayfield et al. |
| 2004/0072539 A1 | 4/2004 | Monte et al. |
| 2004/0102156 A1 | 5/2004 | Loner |
| 2004/0121727 A1 | 6/2004 | Karabinis |
| 2004/0203393 A1 | 10/2004 | Chen |
| 2004/0240525 A1 | 12/2004 | Karabinis et al. |
| 2005/0025042 A1 * | 2/2005 | Hadad .......................... 370/208 |
| 2005/0041619 A1 | 2/2005 | Karabinis et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0181786 A1 | 8/2005 | Karabinis et al. |
| 2005/0201449 A1 | 9/2005 | Churan |
| 2005/0227618 A1 | 10/2005 | Karabinis et al. |
| 2005/0239399 A1 | 10/2005 | Karabinis |
| 2005/0260947 A1 | 11/2005 | Karabinis et al. |
| 2005/0260984 A1 | 11/2005 | Karabinis |
| 2005/0272369 A1 | 12/2005 | Karabinis et al. |
| 2006/0040613 A1 | 2/2006 | Karabinis et al. |

| | | |
|---|---|---|
| 2006/0094420 A1 | 5/2006 | Karabinis |
| 2006/0135058 A1 | 6/2006 | Karabinis |
| 2006/0135070 A1 | 6/2006 | Karabinis |
| 2006/0165120 A1 | 7/2006 | Karabinis |
| 2006/0194576 A1 | 8/2006 | Karabinis et al. |
| 2006/0205347 A1 | 9/2006 | Karabinis |
| 2006/0205367 A1 | 9/2006 | Karabinis |
| 2006/0211452 A1 | 9/2006 | Karabinis |
| 2006/0246838 A1 | 11/2006 | Karabinis |
| 2006/0252368 A1 | 11/2006 | Karabinis |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0026867 A1* | 2/2007 | Karabinis ............... 455/447 |
| 2007/0037514 A1 | 2/2007 | Karabinis |
| 2007/0072545 A1 | 3/2007 | Karabinis et al. |
| 2007/0082609 A1* | 4/2007 | Kiesling ............... 455/12.1 |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0184849 A1 | 8/2007 | Zheng |
| 2007/0192805 A1 | 8/2007 | Dutta et al. |
| 2007/0202816 A1 | 8/2007 | Zheng |
| 2007/0232298 A1 | 10/2007 | Karabinis |
| 2007/0243866 A1 | 10/2007 | Karabinis |
| 2007/0281612 A1 | 12/2007 | Benjamin et al. |
| 2007/0293214 A1 | 12/2007 | Ansari et al. |
| 2008/0008264 A1 | 1/2008 | Zheng |
| 2008/0032671 A1 | 2/2008 | Karabinis |
| 2008/0075109 A1 | 3/2008 | Zangi |
| 2008/0113666 A1 | 5/2008 | Monte et al. |
| 2008/0119190 A1 | 5/2008 | Karabinis |
| 2008/0160993 A1 | 7/2008 | Levin et al. |
| 2008/0182572 A1 | 7/2008 | Tseytlin et al. |
| 2008/0214207 A1 | 9/2008 | Karabinis |
| 2008/0268836 A1 | 10/2008 | Karabinis et al. |
| 2009/0006906 A1* | 1/2009 | Jacobsen et al. ............. 714/52 |
| 2009/0011704 A1 | 1/2009 | Karabinis |
| 2009/0016291 A1 | 1/2009 | Oota et al. |
| 2009/0029696 A1 | 1/2009 | Karabinis |
| 2009/0042509 A1 | 2/2009 | Karabinis et al. |
| 2009/0047971 A1 | 2/2009 | Fu |
| 2009/0075645 A1 | 3/2009 | Karabinis |
| 2009/0088151 A1 | 4/2009 | Karabinis |
| 2009/0137203 A1 | 5/2009 | Karabinis et al. |
| 2009/0156154 A1 | 6/2009 | Karabinis et al. |
| 2009/0170427 A1 | 7/2009 | Karabinis |
| 2009/0170428 A1 | 7/2009 | Karabinis |
| 2009/0170429 A1 | 7/2009 | Karabinis |
| 2009/0186622 A1 | 7/2009 | Karabinis |
| 2009/0231187 A1 | 9/2009 | Churan |
| 2009/0296628 A1 | 12/2009 | Karabinis |
| 2009/0305697 A1 | 12/2009 | Karabinis et al. |
| 2009/0312013 A1 | 12/2009 | Karabinis |
| 2010/0009677 A1 | 1/2010 | Karabinis et al. |
| 2010/0015971 A1 | 1/2010 | Good et al. |
| 2010/0029269 A1 | 2/2010 | Karabinis |
| 2010/0035604 A1 | 2/2010 | Dutta et al. |
| 2010/0035605 A1 | 2/2010 | Karabinis |
| 2010/0035606 A1 | 2/2010 | Karabinis |
| 2010/0039967 A1 | 2/2010 | Karabinis et al. |
| 2010/0041394 A1 | 2/2010 | Karabinis |
| 2010/0041395 A1 | 2/2010 | Karabinis |
| 2010/0041396 A1 | 2/2010 | Karabinis |
| 2010/0048201 A1 | 2/2010 | Karabinis |
| 2010/0054160 A1 | 3/2010 | Karabinis |
| 2010/0118765 A1* | 5/2010 | Agarwal ............... 370/316 |
| 2010/0120419 A1 | 5/2010 | Zheng et al. |
| 2010/0141509 A1 | 6/2010 | Levin et al. |
| 2010/0184370 A1 | 7/2010 | Zheng et al. |
| 2010/0184381 A1 | 7/2010 | Zheng et al. |
| 2010/0184427 A1 | 7/2010 | Zheng et al. |
| 2010/0190507 A1 | 7/2010 | Karabinis et al. |
| 2010/0203828 A1 | 8/2010 | Zheng |
| 2010/0203884 A1 | 8/2010 | Zheng et al. |
| 2010/0210209 A1 | 8/2010 | Karabinis et al. |
| 2010/0210262 A1 | 8/2010 | Karabinis et al. |
| 2010/0240362 A1 | 9/2010 | Karabinis |

FOREIGN PATENT DOCUMENTS

| | | |
|---|---|---|
| EP | 0 597 225 A1 | 5/1994 |
| EP | 0 506 255 B1 | 11/1996 |
| EP | 0 746 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1 773 085 A1 | 4/2007 |
| EP | 1 944 885 A2 | 7/2008 |
| EP | 1 569 363 B1 | 11/2008 |
| KR | 10-2008-0096966 | 11/2008 |
| WO | WO 01/54314 A1 | 7/2001 |
| WO | WO 2008/024877 A1 | 2/2008 |

OTHER PUBLICATIONS

Kim et al., "Optimal Subchannel Allocation Scheme in Multicell OFDMA Systems", Vehicular Technology Conference, 2004. VTC 2004—Spring. 2004 IEEE 59$^{th}$ Milan, Italy May 17-19, 2004, Piscataway, NJ, USA, IEEE US, vol. 3, May 17, 2004, pp. 1821-1825, XP010766459, ISBN: 978-0-7803-8255-8.

Invitation to Pay Additional Fees corresponding to International Application No. PCT/US/2010/036102; Date of Mailing: Feb. 21, 2011; 7 pages.

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

International Preliminary Report on Patentability, PCT Application No. PCT/US2010/036102, Sep. 28, 2011.

* cited by examiner

SYSTEMS, METHODS AND NETWORK COMPONENTS THAT PROVIDE DIFFERENT SATELLITE SPOT BEAM RETURN CARRIER GROUPINGS AND REUSE PATTERNS

CROSS REFERENCE TO RELATED APPLICATION

The present application claims the benefit of and priority to U.S. Provisional Patent Application No. 61/185,246, filed Jun. 9, 2009, entitled "Frequency Reuse for Broadband and Narrowband MSS System," the disclosure of which is hereby incorporated herein by reference in its entirety.

FIELD OF THE INVENTION

Embodiments of the invention relate to wireless communications systems and methods, and more particularly to satellite wireless communications systems and methods.

BACKGROUND

Wireless communications systems are widely used for transmitting and receiving information between at least two entities using a modulated carrier frequency that occupies a substantially contiguous band of frequencies over a predetermined bandwidth. For example, a Frequency Division Duplexing (FDD) communications system and method may use a number of modulated sub-carriers which are contiguous in frequency so as to occupy an aggregate (overall) carrier bandwidth of, for example, 1.25 MHz. Terrestrial wireless communications systems and methods may be based on cellular/PCS and/or other techniques.

Satellite communications systems employ at least one space-based network component, such as one or more satellites, that is/are configured to communicate with a plurality of satellite radioterminals. A satellite radioterminal communications system may use a single antenna beam covering an entire area served by the system. Alternatively, in cellular satellite radioterminal communications systems, multiple beams are provided, each of which can serve distinct geographical areas in the overall service region, to collectively serve an overall satellite footprint. Thus, a cellular architecture similar to that used in conventional terrestrial cellular/PCS radioterminal systems can be implemented in cellular satellite-based systems. The satellite typically communicates with radioterminals over a bidirectional communications pathway, with radioterminal communication signals being communicated from the satellite to the radioterminal over a downlink or forward link, and from the radioterminal to the satellite over an uplink or return link.

Terrestrial networks can enhance cellular satellite radioterminal system availability, efficiency and/or economic viability by terrestrially reusing at least some, if not all, of the frequency bands that are allocated to satellite systems. In particular, it is known that it may be difficult for cellular satellite radioterminal systems to reliably serve densely populated areas, because the satellite signal may be blocked by high-rise structures and/or may not penetrate into buildings. As a result, the satellite spectrum may be underutilized or unutilized in such areas. The terrestrial reuse of at least some of the satellite system frequencies can reduce or eliminate this potential problem.

Moreover, the capacity of a hybrid system, comprising terrestrial and satellite-based connectivity and configured to terrestrially reuse at least some of the satellite-band frequencies, may be higher than a corresponding satellite-only system since terrestrial frequency reuse may be much denser than that of the satellite-only system. In fact, capacity may be enhanced where it may be mostly needed, i.e., in densely populated urban/industrial/commercial areas where the connectivity/signal(s) of a satellite-only system may be unreliable. As a result, a hybrid (satellite/terrestrial cellular) system that is configured to reuse terrestrially at least some of the frequencies of the satellite band may become more economically viable, as it may be able to serve more effectively and reliably a larger subscriber base.

In terrestrial wireless network (e.g., PCS), frequency reuse between cells/sectors may range from 1 up to 9 depending upon the air interface protocol, interference conditions, and/or traffic demand. The lower the reuse scheme, the more the same spectrum is reused across the cells/sectors, thereby increasing network capacity. However, the higher the frequency reuse, the lesser is the co-channel interference between co-channel cells/sectors of the cellular network.

U.S. Pat. No. 6,684,057, to Karabinis, and entitled Systems and Methods for Terrestrial Reuse of Cellular Satellite Frequency Spectrum, the disclosure of which is hereby incorporated herein by reference in its entirety as if set forth fully herein, describes that a satellite frequency can be reused terrestrially by an ancillary terrestrial network even within the same satellite cell, using interference cancellation techniques. In particular, a system according to some embodiments of U.S. Pat. No. 6,684,057 includes a space-based network component that is configured to receive wireless communications from a first radiotelephone in a satellite footprint over a satellite radiotelephone frequency band, and an ancillary terrestrial network that is configured to receive wireless communications from a second radiotelephone in the satellite footprint over the satellite radiotelephone frequency band. The space-based network component also receives the wireless communications from the second radiotelephone in the satellite footprint over the satellite radiotelephone frequency band as interference, along with the wireless communications that are received from the first radiotelephone in the satellite footprint over the satellite radiotelephone frequency band. An interference reducer is configured to reduce the interference from the wireless communications that are received by the space-based network component from the first radiotelephone in the satellite footprint over the satellite radiotelephone frequency band.

Satellite radioterminal communications systems that may employ terrestrial reuse of satellite frequencies are also described in U.S. Pat. No. 6,785,543 to Karabinis, entitled Filters For Combined Radiotelephone/GPS Terminals, and Published U.S. Patent Application Nos. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, US 2004/0121727 to Karabinis, entitled Systems and Methods For Terrestrial Reuse of Cellular Satellite Frequency Spectrum In A Time-Division Duplex Mode, US 2004/0192293 to Karabinis, entitled Aggregate Radiated Power Control For Multi-Band/Multi-Mode Satellite Radiotelephone Communications Systems And Methods, US 2004/0142660 to Churan, entitled Network-Assisted Global Positioning Systems, Methods And Terminals Including Doppler Shift And Code Phase Estimates, and US 2004/0192395 to Karabinis, entitled Co-Channel Wireless Communication Methods and Systems Using Nonsymmetrical Alphabets, all of which are assigned to the assignee of the present invention, the disclosures of all of which are hereby incorporated herein by reference in their entirety as if set forth fully herein.

Satellite communications systems may be used for voice and/or data. Moreover, satellite communications systems are increasingly being used with broadband information, such as multimedia information. Unfortunately, it may be difficult to send and receive broadband information over conventional satellite communications systems and methods. In particular, communications frequencies allocated to satellite communications may be highly fragmented, and may not include contiguous segments having a wide enough bandwidth to individually support broadband communications. Moreover, as the demand for wider bandwidth communications systems and methods increases, there may be increased need to utilize non-contiguous bandwidth segments for communication of a broadband communications signal for both satellite and terrestrial based communications.

Communications systems for transmitting broadband signals over discontiguous frequency segments are disclosed in commonly assigned and copending U.S. patent application Ser. No. 11/006,318, filed Dec. 7, 2004 and entitled "Broadband Wireless Communications Systems and Methods Using Multiple Non-Contiguous Frequency Bands/Segments." As demand for broadband communications using discontiguous frequency bands increases, improved communications systems and/or methods may be desired.

SUMMARY

Some embodiments of the present invention are directed to a communications network that dynamically regulates carrier assignment for bidirectional communications between a network component and radioterminals. The communications network includes a resource manager that regulates the carrier assignments by selecting among a plurality of FDD return subcarriers within at least one FDD return carrier grouping for coupling to a selected one of a plurality of FDD forward carriers, and by controlling the network component to receive communications from the radioterminal on the selected FDD return subcarrier and to transmit communications to the radioterminal on the selected FDD forward carrier.

The resource manager may dynamically couple and decouple particular ones of the FDD return subcarriers to particular ones of the FDD forward carriers in response to changing communication bandwidth requirements between the radioterminals and the network component. The resource manager may alternatively or additionally regulate the coupling and decoupling of particular ones of the FDD return subcarriers to particular ones of the FDD forward carriers to avoid or minimize cochannel interference.

Some other embodiments of the present invention are directed to a communications network that has different FDD forward carrier reuse pattern than the FDD return subcarrier across a plurality of spot beams. A resource manager can regulate the assignment of FDD forward carriers and FDD return carriers that are operated by a network component to provide a plurality of service areas for bidirectional communications with radioterminals, and to provide a different reuse pattern for the FDD forward carriers than the FDD return carriers across the plurality of service areas.

The resource manager may regulate the assignment to provide a higher frequency reuse factor for greater physical separation between reuse of FDD return carriers relative to reuse of FDD forward carriers. The resource manager may regulate the assignment to provide a uniform frequency reuse patterns for FDD forward carriers and a non-uniform frequency reuse patterns for FDD return carriers.

The resource manager may dynamically vary the frequency reuse pattern assigned for FDD return carriers in response to changing requirements for communication bandwidth from radioterminals to the network component. For example, the resource manager may dynamically assign and deassign particular ones of the FDD return subcarriers to particular ones of the service areas in response to changing communication bandwidth requirements between the radioterminals and the network component.

The resource manager may dynamically vary the frequency reuse pattern for the FDD return carriers across the service areas in response to a determination of levels of interference present in the frequency ranges of the FDD return subcarriers. For example, the resource manager may dynamically assign and deassign particular ones of the FDD return subcarriers to particular ones of the service areas in response to changing levels of interference present in the frequency ranges of the particular ones of the FDD return subcarriers.

Other systems and methods according to embodiments of the invention will be or become apparent to one with skill in the art upon review of the following drawings and detailed description. It is intended that all such additional systems and methods be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the invention and are incorporated in and constitute a part of this application, illustrate certain embodiments of the invention.

DETAILED DESCRIPTION

Figure 1:
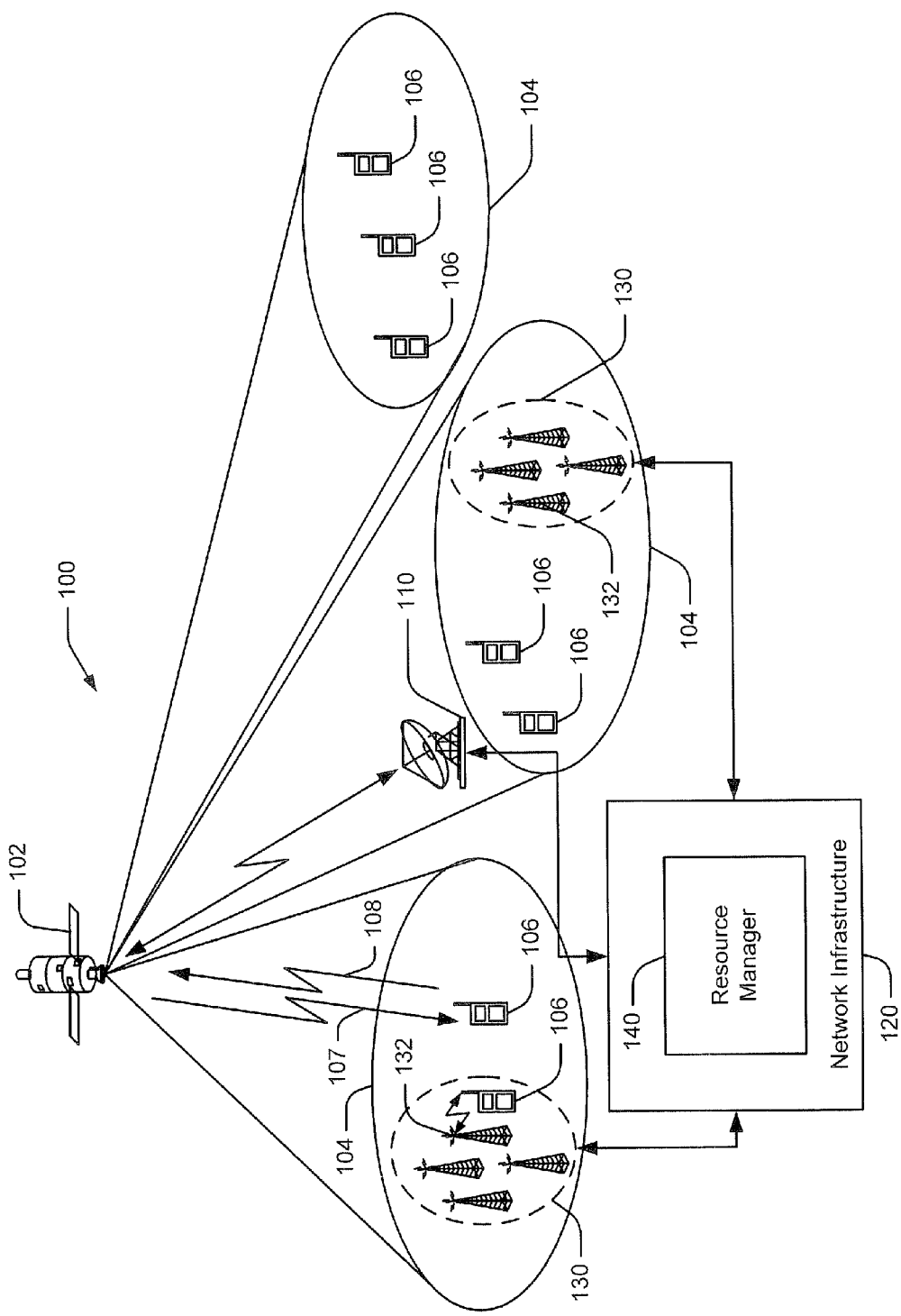
FIG. 1 is a diagram illustrating a satellite and terrestrial communications system providing overlaid operation of a space-based network (SBN) and an ancillary terrestrial network (ATN) that operate according to some embodiments of the present invention.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the tennis "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these Watts. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

The overall design and operation of wireless communications systems and methods are well known to those having skill in the art, and need not be described further herein. As used herein, the term "radioterminal" includes cellular and/or satellite radioterminals; Personal Communications System (PCS) terminals; Personal Digital Assistants (PDA) that can include a radio frequency transceiver; and/or conventional laptop and/or palmtop computers or other devices, which include a radio frequency transceiver. As used herein, the term "radioterminal" also includes any other radiating user device/equipment that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A "radioterminal" also may be referred to herein as a "subscriber station," "radiotelephone," "terminal", "wireless terminal" or "wireless user device".

Furthermore, as used herein, the term "space-based communications network (SBN)" includes one or more satellites at any orbit (geostationary, substantially geostationary, medium earth orbit, low earth orbit, etc.) and may further include terrestrial components, such as a ground station and/or network infrastructure. An "ancillary terrestrial communications network (ATN)" may include one or more "ancillary terrestrial components (ATCs)", which may each include a plurality of geographically distributed base stations (e.g., in cellular arrangements), which may be ground installations, vehicle-borne installations, airborne installations and/or ship-borne installations. The term "network component" may include a component of a SBN and/or an ATN, such as a satellite, a satellite gateway, and/or a terrestrial base station.

Some embodiments of the present invention are described in the context of an SBN that is overlaid on an ATN, although the invention is not limited thereto as it may be embodied in any type of communications network, including space-based networks and/or terrestrial networks (e.g., cellular networks). FIG. 1 is a diagram that illustrates a communications system 100 that provides overlaid operation of a SBN and ATN according to some embodiments of the present invention. At least a portion of spectrum that is used for mobile satellite communications may be used by ancillary terrestrial components (ATCs) in various locations in a service area, such as in urban/suburban areas of the continental United States (CONUS). Satellite spot beam service areas of the SBN are overlaid on this service area, such that coverage zones of the ATCs and the SBN at least partially overlap.

Referring to the exemplary embodiment of FIG. 1, the communications system 100 may include one or more satellites 102, which provide spot beams 104 for communicating with radioterminals 106. The communications system 100 may further include a ground station 110 which serves both as a satellite base station and as a gateway to ground-based network infrastructure 120, which may include, for example, mobile switching centers (MSCs), location registers, backbone networks (e.g., fiber optic networks) and other network infrastructure that supports communications with the terminals 106 via the one or more satellites 102. An ATN 130 includes one or more ATCs, such a base stations 132, which may be distributed to provide terrestrial coverage cells in higher user density environments, such as urban and/or suburban areas. The ATN 130 is also communicatively coupled to the network infrastructure 120. As shown in FIG. 1, the network infrastructure 120 may further include a resource manager 140.

In a conventional SBN that uses FDD, each forward carrier is paired with a return carrier that has the same channel bandwidth as the forward carrier, and has static frequency spacing from the corresponding forward carrier. For example, in a CDMA EV-DO communication network, the communication spectrum is divided into a defined number of carriers each having a bandwidth of 1.25 MHz. For each 1.25 MHz forward carrier, there is a paired 1.25 MHz return carrier that occurs at a pre-defined static (i.e., does not vary over time) spacing therebetween within the frequency spectrum. Accordingly, for a 10 MHz frequency spectrum, there are eight coupled pairs, each having a forward 1.25 MHz bandwidth carrier and a return 1.25 MHz bandwidth carrier. Each of the coupled pairs of forward carrier and return carrier are reused at a static spacing across the SBN spot beams.

Embodiments of the present invention are directed to dynamic regulation of carrier assignment for bidirectional communications between the satellite 102 and the radioterminals 106. Some embodiments may improve the efficiency and/or performance of the radio bearers assigned to the carriers.

1. Dynamic Coupling of FDD Forward Carriers to FDD Return Subcarriers:

In accordance with some embodiments, the FDD forward channels are not coupled in a static pattern to the FDD return subcarriers. Each FDD return carrier can be divided into a plurality of FDD return subcarriers. The resource manager 140 may make carrier assignments by coupling each FDD forward channel with selected ones of the FDD return subcarriers. For a particular radioterminal 106, the resource manager 140 can select a particular one of the forward carriers that will be used to transmit communications in a forward direction 107 from the satellite 102 to the particular radioterminal 106, and can select among a plurality of FDD return subcarriers that are within at least one FDD return carrier grouping that is/are to be used to transmit communications in a return direction 108 from the particular radioterminal 106 to the satellite 102. The resource manager 140 may then control the satellite 102 to receive communications from the particular radioterminal 106 on the selected FDD return subcarrier(s) and to transmit communications to the particular radioterminal 106 on the selected FDD forward carrier.

The identity and/or number of FDD return subcarriers that are coupled to a particular one of the FDD forward channels can vary over time responsive to, for example, changes in communication bandwidth requirements from the radioterminals to the satellite and/or responsive to interference that is present in the frequency range of the particular FDD return subcarriers. Accordingly, the resource manager 140 may control the satellite 102 to provide a wideband forward communication channel that is coupled to a variable amount of return communication bandwidth for bidirectional communications between the satellite 102 and a particular radioterminal 106 within a spot beam 104. Individual ones of the FDD forward carriers may thereby be dynamically coupled and decoupled from selected ones of the FDD return subcarriers, and the selected FDD return subcarriers may be spaced apart within different FDD return carrier groupings.

Accordingly, for return traffic from the radioterminals 106 to the satellite 102, any number of FDD return subcarrier(s) and FDD forward carrier(s) can be assigned to the same spot beam 104. For example, a particular radioterminal 106 can be assigned a wideband FDD forward carrier, which is shared with other radioterminals 106 within the same spot beam 104, for receiving information, and can be assigned one or more of the plurality of the FDD return subcarrier(s), which may or may not be shared with other radioterminals 106 within the same spot beam 104, for transmitting information. The FDD return subcarriers may have different bandwidths, with some being narrowband and others being wideband. A radioterminal 106 may be assigned any combination of narrowband and wideband FDD return subcarriers. When a radioterminal 106 is assigned more than one FDD return subcarrier, it may be preferable for those FDD return subcarriers to occupy contiguous frequency bands to avoid a possible need for the radioterminal 106 to have a plurality of separate parallel transmission circuit pathways that are each configured to transmit data in different ones of the non-contiguous frequency bands.

The radio access technologies used in the wideband and narrowband return links may be either the same albeit using different modulation and coding rates, or completely dissimilar. One example of the use of dissimilar return access technologies in the return link and a common radio access technology in the forward link would be as follows. In the forward link, the radio bearers would use EVDO radio access technology on 1.25 MHz bandwidth carriers. All radio terminals would have the ability to receive, demodulate and use data on sent on such radio bearers. On the return link, the radio bearers could be FDMA on a plurality of narrowband carriers, such as 6.4 and 12.8 kHz, or EVDO on a 1.25 MHz bandwidth carrier. Radio terminals may be configured as either single-transmit-mode or dual-transmit-mode based on whether they are able to transmit both types of radio bearers. The resource manager 140 would be aware of the capabilities of each terminal and assign return radio bearers to the terminals accordingly.

A potential advantage of allowing a plurality of narrowband and wideband FDD return subcarriers to be coupled to a common FDD forward carrier is that low data rate devices, such as handsets, and high data rate devices, such as transportable data terminals, can share forward communication spectrum within a same spot beam of the satellite 102. Moreover, it is noted that smaller devices, such as handsets, are typically configured to receive higher data rates in the forward direction 107 from the satellite 102 then they are able to transmit in the return direction 108.

For example, some transportable radioterminals/handsets may be able to receive 38.4 kbps of data on a 1.25 MHz FDD forward carrier from the satellite 102. However, they may only be able to transmit 4.8 kpbs of data on a 1.25 MHz FDD return carrier due to transmission power constraints, link condition, and/or antenna gain limitations. Therefore, for EIRP-limited (equivalent isotropical radiated power) devices, it may be advantageous to mix wider bandwidths in the forward direction 107 from the satellite 102 with narrower bandwidths in the return direction 108. In contrast, radioterminals that have higher antenna gains and have higher transmission power capabilities may be assigned wider bandwidth carriers in both the forward direction 107 and the return direction 108.

The radio access technologies that are used by the satellite 102 and the radioterminals 106 to bidirectionally communicate in the forward and return directions 107-108 may be the same or different. For example, the satellite 102 may transmit data in the forward direction 107 through the FDD forward carriers using EVolution-Data Optimized (EVDO), and some radioterminals 106 may use EVDO to transmit data through wideband ones of the FDD return subcarriers (or an entire FDD return carrier grouping) and other radioterminals 106 may use Frequency Division Multiple Access (FDMA) and/or Time Division Multiple Access (TDMA) to transmit data through narrowband ones of the FDD return subcarriers.

Although the resource manager 140 has been illustrated in FIG. 1 as residing in the network infrastructure for exemplary explanation, the invention is not limited thereto. The resource manager 140 may alternatively/additionally at least partially reside in the satellite 102, the ground station 110, and/or other network components, and some of the associated operations described herein for the resource manager 140 may be carried out by the terminals 106.

Figure 2:
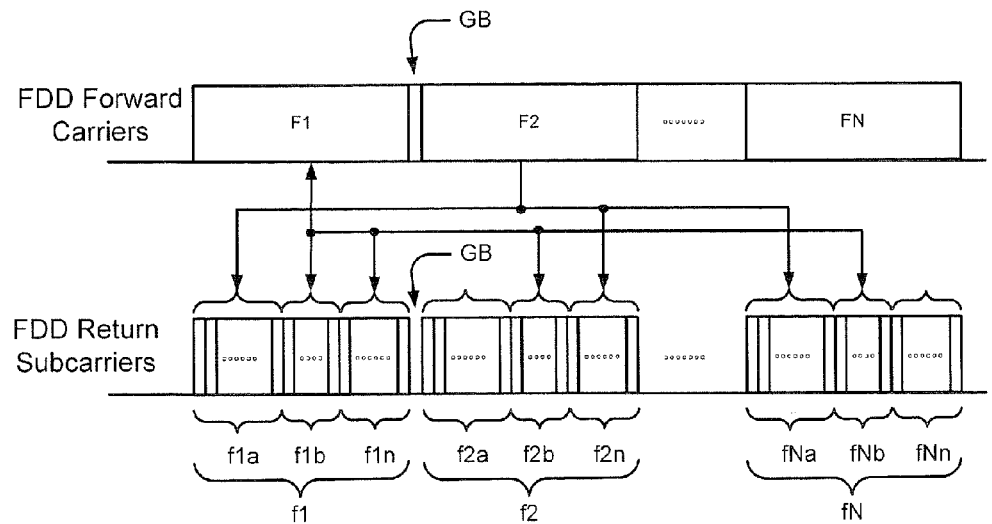
FIG. 2 is a diagram illustrating frequency assignments between FDD forward carriers and FDD return subcarriers within FDD return carrier groupings according to some embodiments of the present invention.

FIG. 2 is a diagram that illustrates exemplary duplex pairings that the resource manager 140 may make between a plurality (N) of different FDD forward carriers (F1, F2, ... FN) and a plurality of FDD return subcarriers (fNa, fNb, ... FNn) that are within a plurality of different FDD return carrier groupings (f1, f2, ... fN) to provide bidirectional communications between the radioterminals 106 and the satellite 102 in different spot beams 104. Referring to FIG. 2, the exemplary FDD forward carriers (F1, F2, ... FN) may each have a bandwidth of 1.25 MHz or any other bandwidths to enable wideband communications in a forward direction from the satellite 102 to the radioterminals 106. The exemplary FDD return carrier groupings (f1, f2, ... fN) may also each have a bandwidth of 1.25 MHz, or any other bandwidths, for communications in a return direction from the radioterminals 106 to the satellite 102. The FDD return subcarriers (fNa, fNb, ... FNn) may, for example, each have a 6.4 kHz frequency bandwidth so that about 194 FDD return subcarriers may reside in each 1.25 MHz bandwidth FDD return carrier grouping (f1, f2, ... fN). In some other embodiments, the FDD return subcarriers (fNa, fNb, ... FNn) may each have a 12.8 kHz frequency bandwidth so that about 97 FDD return subcarriers may reside in each 1.25 MHz bandwidth FDD return carrier grouping (f1, 12, ... fN).

Guard bands GB may be reserved between each of the FDD forward carriers and FDD return carrier groupings to provide isolation therebetween. The width of the guard bands GB between the FDD forward carriers may be defined based on frequency rolloff characteristics of signals that are transmitted by transmitter circuitry in the satellite 102, and the width of the guard bands GB between the FDD return carrier groupings may be defined based on frequency rolloff characteristics of signals that are transmitted by transmitter circuitry in the radioterminals 106.

With further reference to the exemplary carrier couplings shown in FIG. 2, the resource manager 140 may selectively couple a first wideband FDD forward carrier F1 to a plurality of FDD return subcarriers that reside in a plurality of differently spaced apart FDD return carrier groupings f1, f2, fN. For example, the first FDD forward carrier F1 can be coupled to the FDD return subcarriers f1b and f1n in a first FDD return carrier group f1, to another FDD return subcarrier f2b in a second FDD return carrier group 12, and to another FDD return subcarrier fNb in an N'th FDD return carrier group fN. The resource manager 140 can then control the satellite 102 to notify the radioterminals 106 that are in a first spot beam 104 that the satellite 102 will transmit control and/or traffic data thereto using the first wideband FDD forward carrier F1, and notify those radioterminals 106 that they will transmit data to the satellite 102 using defined ones of the FDD return subcarriers f1b, f1n, f2b and/or fNb.

The satellite 102 may, for example, transmit data to a first radioterminal 106 in the first spot beam 104 through the FDD forward carrier F1 and receive return data from the first radioterminal 106 through the return subcarrier f1b, transmit other data to a second radioterminal 106 in the first spot beam 104 through the FDD forward carrier F1 and receive return data from the second radioterminal 106 through the return subcarriers f1n and f2b, and transmit yet other data to a third radioterminal 106 in the first spot beam 104 through the FDD forward carrier F1 and receive return data from the third radioterminal 106 through the return subcarrier fNb.

In an adjacent second spot beam 104, the resource manager 140 may similarly selectively couple a second wideband FDD forward carrier F2 to FDD return subcarriers that reside in a plurality of different spaced apart FDD return carrier groupings which include FDD return subcarriers f1a in the first FDD return carrier group f1, another FDD return subcarrier f2n in the second FDD return carrier group f2, and another FDD return subcarrier fNa in the N'th FDD return carrier group fN. The resource manager 140 can then control the satellite 102 to notify the radioterminals 106 that are in the second first spot beam 104 that the satellite 102 will transmit control and traffic data thereto using the second wideband FDD forward carrier F2, and notify each of those radioterminals 106 as to which particular one or more of FDD return subcarriers f1a, f2n, and/or fNa they are to use to transmit data to the satellite 102.

In this manner, the resource manager 140 may assign communication couplings between the FDD forward carriers F3-FN and not yet assigned ones of the FDD return subcarriers within the FDD return carrier groupings f1-fN for use in respective forward and return communications between the satellite 102 and radioterminals that are within other ones of the spot beams 106.

Figure 3:
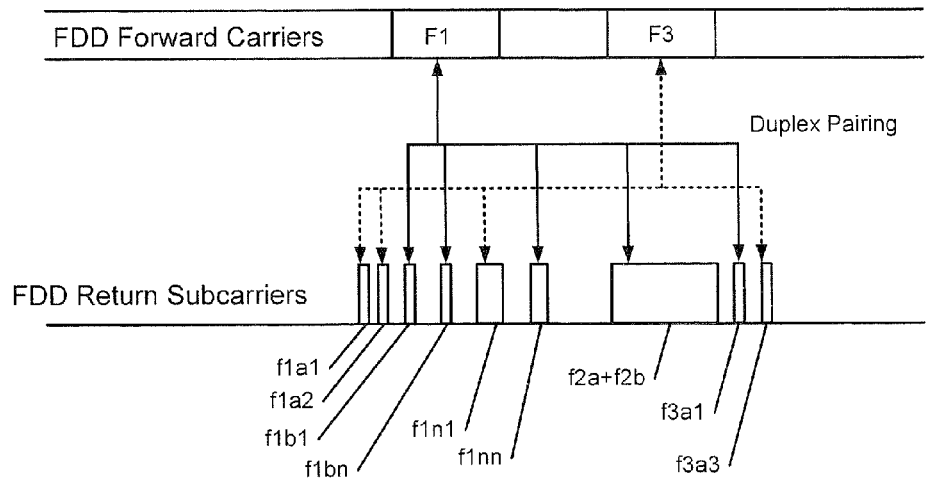
FIG. 3 is a diagram illustrating duplex pairing assignments between FDD forward carriers and a plurality of FDD return subcarriers according to some embodiments of the present invention.

In some further embodiments, some or all of the FDD return subcarriers f1a-f1n, f2a-f2n, ... fNa-fNn are further subdivided into smaller bandwidth subcarriers that are separately assigned to individual ones of the radioterminals 106 for transmission of data to the satellite 102. Reference is made to FIG. 3 which illustrates another example of duplex pairing assignments that have been made between two FDD forward carriers F1 and F3 and a plurality of FDD return subcarriers, some of which are further subdivided into smaller units having different bandwidth sizes. The satellite 102 transmits data to the radioterminals 106 in a first spot beam 104 using the FDD forward carrier F1 and selects from among a first set of one or more smaller bandwidth slivers of at least some of the FDD return subcarriers f1-fN of FIG. 2 for receiving data from the radioterminals 106 in the first spot beam 104. The first set may, for example, include two narrow bandwidth slivers of the FDD return subcarrier f1b of FIG. 2 (e.g., f1b1 and f1bN), a combination of two wider bandwidth FDD return subcarriers f2a and f2b of FIG. 2, and a narrow bandwidth sliver of the FDD return subcarrier f3a of FIG. 2 (e.g., f3a3).

Similarly, the resource manager 140 may control the satellite gateway 110 to transmit data to the radioterminals 106 in a second spot beam 104 using the FDD forward carrier F2 and to receive data from those radioterminals 106 using a second set of one or more smaller bandwidth slivers of at least some of the FDD return subcarriers f1-fN of FIG. 2. The second set may, for example, include two narrow bandwidth slivers of the FDD return subcarrier f1a of FIG. 2 (e.g., f1a1 and f1a2), a wider bandwidth sliver of the FDD return subcarrier f1n of FIG. 2 (e.g., f1n1), and a narrow bandwidth sliver of the FDD return subcarrier f3a of FIG. 2 (e.g., f3a1).

In this manner, the resource manager 140 selectively couples particular FDD forward carriers with particular FDD return subcarriers to provide bidirectional communications between the satellite 102 and the radioterminals 106. As described above, the FDD return subcarriers may not be limited to being selected from a single FDD return carrier grouping, but may instead be selected from a plurality of spaced apart FDD return carrier groupings. The identity and/or number of FDD return subcarriers that are selectively coupled and decoupled from a particular one of the FDD forward carriers can be dynamically controlled by the resource manager 140 to compensate for changes that occur in the communication bandwidth requirements from one or more of the radioterminals 106 to the satellite 102 and/or responsive to interference that is present in the frequency range of the particular FDD return subcarriers.

In some embodiments, some of the FDD forward carriers F1-FN, some of the FDD return carrier groupings f1-fN, and/or some of the FDD return subcarriers in the FDD return carrier groupings f1-fN may be assigned for exclusive use by the ATN 130 for communication between the base stations 132 and the radioterminals 132 and/or may be dynamically assigned based on demand and/or other defined events for used by both the SBN 100 and the ATN 130. Such use/reuse of carriers in a same or adjacent frequency band for communications by the radioterminals 106 to/from the base stations 132 and to/from the satellite 102 may result in interference therebetween.

In some embodiments, the resource manager 140 responds to at least a threshold increase in communication return traffic from the radioterminals 106 in a particular spot beam by increasing the number of FDD return subcarriers that are coupled to a particular FDD forward carrier that is assigned for shared use by those radioterminals 106 to receive data in that spot beam. Similarly, the resource manager 140 may respond to at least a threshold decrease in communication traffic from those radioterminals 106 by decreasing the number of FDD return subcarriers that are coupled to the particular FDD forward carrier. The additional FDD return subcarriers may be selected from a same FDD return carrier grouping or they may be selected from two or more different FDD return carrier groupings, which may be spaced apart with other FDD return carrier groupings interspersed therebetween.

Figure 4:
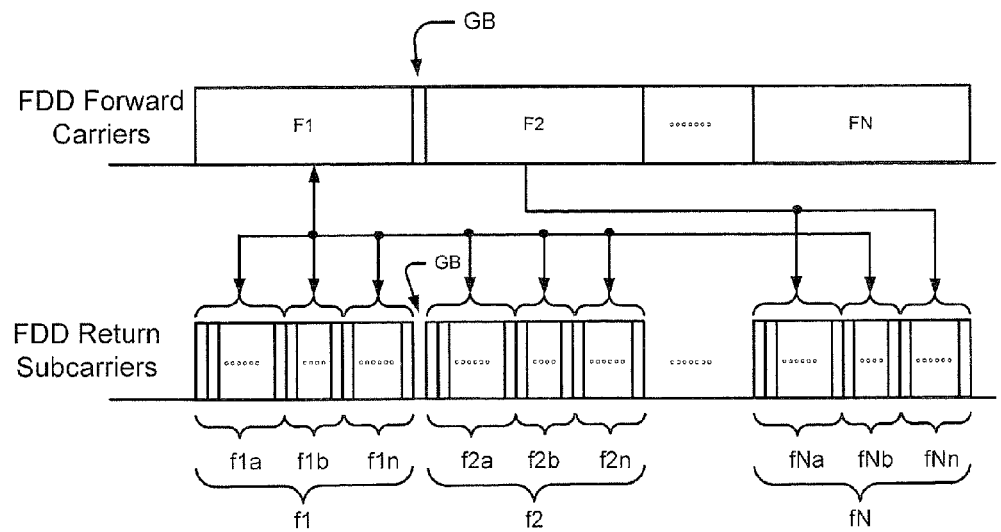
FIG. 4 is a diagram illustrating operations that may be carried out to dynamically couple and decouple FDD forward carriers and FDD return subcarriers to change the couplings from those shown in FIG. 2 in order to respond to changes in the communication bandwidth requirements of radioterminals in different spot beams according to some embodiments of the present invention.

For example, FIG. 4 illustrates various non-limiting exemplary operations that may be carried out by the resource manager 140 to dynamic couple and decouple FDD forward carriers and FDD return subcarriers to change the couplings from those shown in FIG. 2 to those shown in FIG. 4 in order to respond to changes in the communication bandwidth requirements of the radioterminals 106 that are located in different spot beams. Referring to FIGS. 1 and 4, the resource manager 140 may monitor the bandwidth requirements of a first group of radioterminals 106 that are assigned to a first FDD forward carrier F1. The bandwidth requirements may be determined based on the total number radioterminals in the first group, based on the number of radioterminals in the first group that are actively requesting a communication pathway through the satellite 102, and/or based on the communication bandwidth that is presently being utilized by one or more of the radioterminals in the first group and projecting future usage based on trend analyses. When the bandwidth requirements increase, such as by a threshold level, the resource manager 140 may respond by dynamically increasing the number of FDD return subcarriers that are coupled to the FDD forward carrier F1.

In particular, the resource manager 140 may change the FDD forward and return couplings from what is shown in FIG. 2 to what is shown in FIG. 4 by decoupling the FDD return subcarriers f1a and f2n from the FDD forward carrier F2 (thereby ceasing their availability for use with the FDD forward carrier F2) and then newly coupling those FDD return subcarriers f1a and f2n to the FDD forward carrier F1 and coupling the additional FDD return subcarriers f2a and fNn to the FDD forward carrier F1. Consequently, the communication bandwidth that is available for use by the radioterminals that are assigned to the FDD forward carrier F1 has been increased by: 1) coupling some previously unassigned FDD return subcarriers to the FDD forward carrier F1; and 2) by decoupling certain FDD return subcarriers from use with the FDD forward carrier F2 for alternate use with the FDD forward carrier F1. In a similar manner, the resource manager 140 may respond to a decrease in the bandwidth requirements, such as by a threshold level, by dynamically decoupling some or all of the FDD return subcarriers f1a, f2n, f2a and fNn from the FDD forward carrier F1, and may recouple some or all of those FDD return subcarriers back to the other FDD forward carriers F2-FN.

The resource manager 140 may similarly respond to increased bandwidth requirements by one or more radioterminals 106 that are assigned to one or more of the other FDD forward carriers F2-FN by coupling more FDD return subcarriers to the corresponding FDD forward carrier(s) for use by those radioterminals 106.

In some embodiments, the additional FDD return subcarriers may be deallocated from the spectrum that is available for use by the ATC 130 and added to the spectrum that is available for use for return communications to the satellite 102.

Figure 5:
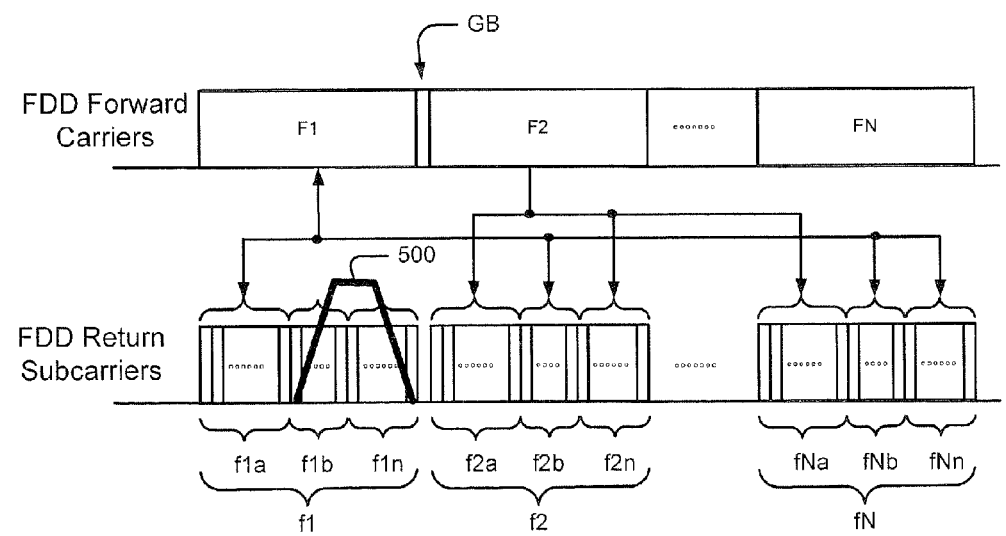
FIG. 5 is a diagram illustrating operations that may be carried out to dynamically couple and decouple FDD forward carriers and FDD return subcarriers to avoid certain known interferences according to some embodiments of the present invention.

In some other embodiments, the resource manager 140 may dynamic regulate the availability of individual ones and/or groups of the FDD return subcarriers for assignment to the radioterminals 106 so as to avoid frequencies known to have excessive interference power spectral densities. FIG. 5 illustrates various non-limiting exemplary operations that may be carried out by the resource manager 140 to dynamically couple and decouple FDD forward carriers and FDD return subcarriers to change the couplings from those shown in FIG. 2 in order to avoid the frequency spectra of known interferences.

Referring to FIG. 5, an interference signal 500 has been illustrated that resides in the frequency range of the FDD return subcarriers f1b-f1n. The resource manager 140 and/or another component of the system 100 may detect when the interference power spectral density exceeds a threshold level and, responsive thereto, identify the frequency spectra of the interference. Interference may be measured, for example, based on received signal strengths during periods of non-use of particular ones of the FDD return subcarriers and/or based on the bit error rate in communications that are conducted through particular ones of the FDD return subcarriers. The resource manager 140 may then attempt to avoid the detected interference signal 500 by removing the FDD return subcarriers F1b-F1n, which have frequencies overlapping with the spectrum of the interference signal 500, from the set of FDD return subcarriers that is available for coupling to the FDD forward carriers F1-FN.

For example, as shown in FIG. 5, the resource manager 140 may attempt to avoid the interference signal 500 by changing the FDD forward and return couplings from those shown in FIG. 2 to those shown in FIG. 5. In particular, the resource manager 140 may decouple the FDD return subcarriers f1b and f1n from the FDD forward carrier F1, and then create a coupling between the FDD return subcarriers f2a and fNn and the FDD forward carrier F1 to maintain the same available return communication bandwidth. The resource manager 140 can thereby control the satellite 102 to provide the identified couplings between the FDD forward carriers and FDD return subcarriers to provide bidirectional communications between the satellite 102 and the radioterminals 106 while avoiding the interfering signal 500.

The resource manager 140 may respond to the subsequent absence of the interfering signal 500 by changing the couplings between the FDD forward carriers and FDD return carrier back to what is shown in FIG. 2 or to another configuration that provides a desired return communication bandwidth while avoiding any other known interfering signals.

Figure 6:
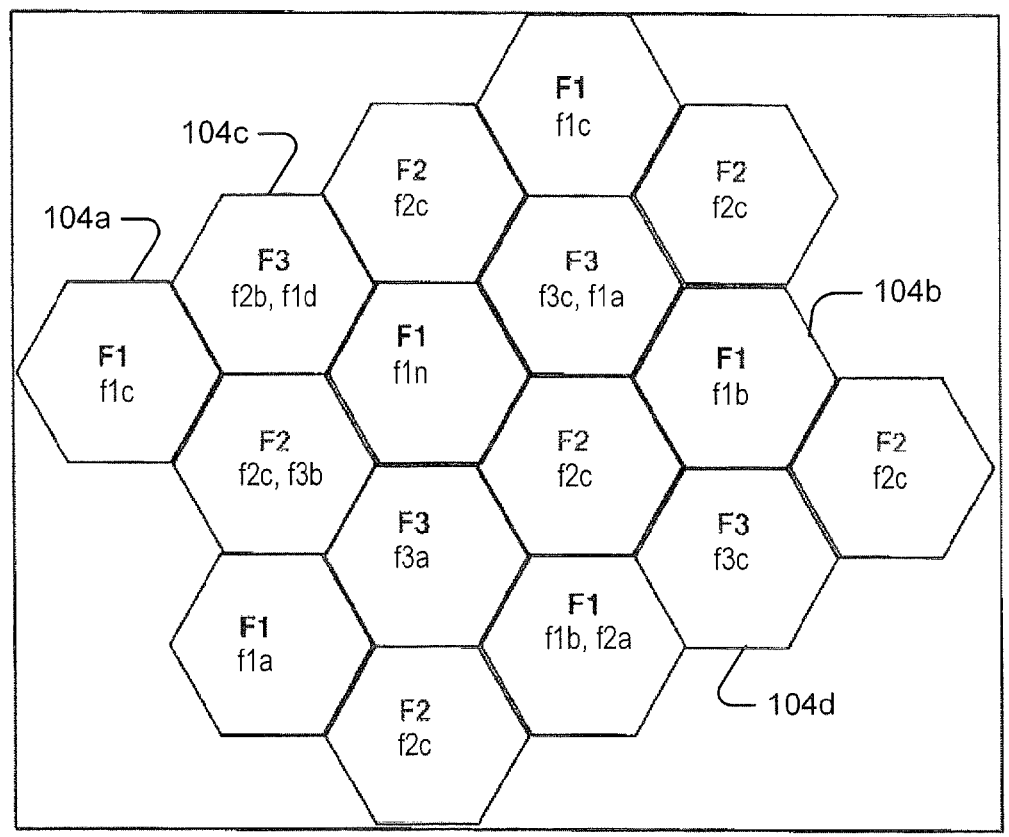
FIG. 6 is a diagram illustrating different spot beam reuse schemes for the FDD forward carriers and the FDD return subcarriers that are shown in FIG. 2 according to some embodiments of the present invention.

2. Different Frequency Reuse Schemes in Forward and Return Directions:

In accordance with some other embodiments, the FDD forward carriers can have different reuse patterns than the FDD return subcarriers across the plurality of spot beams 104. FIG. 6 is a diagram that illustrates different exemplary spot beam reuse schemes for the FDD forward carriers and FDD return subcarriers that are shown in FIG. 2. Referring to FIG. 6, the potentially large number, n, of FDD return subcarriers that may be within each FDD return carrier grouping may allow a large frequency reuse factor, such as 7 or 9, to be deployed across the spot beams 104. In sharp contrast, the FDD forward carriers may be deployed with a much smaller frequency reuse factors, such as 3. A larger frequency reuse factor for the FDD return subcarriers may provider greater interference rejection, which may provide a particularly beneficial improvement in the link margin for the more power constrained transmissions by the radioterminals 106 to the satellite 102. In contrast, the satellite base station in 110 may dynamically assign higher transmit power, with associated greater link margins, to particular disadvantaged terminals without exceeding its aggregate EIRP limit; therefore, it may be acceptable to operate the forward link FDD carriers with lower frequency reuse factors than the return link FDD carriers.

In the exemplary embodiment of FIG. 6, three FDD forward carriers (F1, F2, and F3) each have 1.25 MHz bandwidth. A reuse scheme of N=3 has been selected for the FDD forward carriers, and a different one of the FDD forward carriers has been assigned to each spot beam 104. Each 1.25 MHz carrier bandwidth is segmented into the narrowband FDD return subcarriers (e.g., f1$a$, f1$b$ ... f1$n$) shown in FIG. 2. In contrast to the constant reuse factor of 3 for the FDD forward carriers, the bandwidth allocation and reuse pattern of the FDD return subcarriers is non-uniform. There is not a uniform duplexing frequency separation between the FDD forward carriers and FDD return subcarriers and there is a non-uniform number of FDD return subcarriers that are allocated across the spot beams 104. The non-uniform separation of the return FDD subcarriers may be desirable for a number of reasons. One example is the following. It may be desirable to create a capacity hotspot in a certain geographical region experiencing high traffic demand. A low frequency reuse factor may be used to achieve high capacity in the said region, while cochannel interference is controlled by limiting cochannel reuse to terminals of relatively low power and/or using uplink satellite-antenna-pattern nulling to mitigate the cochannel interference.

As shown in FIG. 6, the FDD forward carrier F1 has been coupled to a single FDD return subcarrier f1$c$ for use in the spot beam 104$a$, and the FDD forward carrier F1 is reused in another spot beam 104$b$ where it is coupled to a different FDD return subcarrier f1$b$. Another FDD forward carrier F3 has been coupled to a pair of FDD return subcarriers f2$b$ and f1$d$ for use in the spot beam 104$c$, and the FDD forward carrier F3 is then reused in another spot beam 104$d$ where it is coupled to another FDD return subcarrier f3$c$. Accordingly, the different frequency reuse factors that are applied to the FDD forward carriers and FDD return subcarriers have created non-uniform bandwidth allocation and reuse patterns across the spot beams 104.

In some embodiments, the resource manager 140 is configured to regulate the assignment of FDD forward carriers and FDD return subcarriers to the spot beams 104. The resource manager 140 may dynamically vary the frequency reuse pattern that are used for the FDD return subcarriers in response to changing requirements for return communication bandwidth from the radioterminals 106 to the satellite 102. For example, the resource manager 140 may dynamically assign, re-assign, and/or deassign particular ones of the FDD return subcarriers to particular ones of the spot beams 104 in response to changing return communication bandwidth requirements. More FDD return subcarriers may be assigned to a particular one of the spot beam 104 in response at least a threshold increase in communication traffic to the satellite 102 from radioterminals 106 that are located within the particular spot beam 104 and/or in response to at least a threshold increase in a number of radioterminals 106 that are located within the particular spot beam 104 and are registered to communicate with the satellite 102.

In some other embodiments, the resource manager 140 may dynamically vary the frequency reuse pattern of the FDD return subcarriers in response to levels of interference that are present in the frequency ranges of the FDD return subcarriers. As explained above, interference may be introduced into the return communications to the satellite 102 from, for example, use/reuse of carriers in a same or adjacent frequency band for communications by the radioterminals 106 to/from the base stations 132 and to/from the satellite 102. The resource manager 140 may dynamically assign, re-assign, and/or deassign particular ones of the FDD return subcarriers to particular ones of the spot beams 104 in response to changing levels of interference that is present in the frequency ranges of the particular ones of the FDD return subcarriers in the associated spot beams 104.

For example, a first FDD return subcarrier in a first FDD return carrier grouping may be removed from a set of the FDD return subcarriers that are available for selective assignment by the resource manager 140 to a selected one of the spot beams 104 in response to a determination that at least a threshold level of interference is present in a frequency range of the first FDD return subcarrier. The first FDD return subcarrier may then be returned back to the set of the FDD return subcarriers that are available for selective assignment by the resource manager 140 to the selected one of the spot beam service areas in response to a determination that less the threshold level of interference is present in the frequency range of the first FDD return subcarrier.

Accordingly, some embodiments of the present invention can dynamically regulate carrier assignment for bidirectional communications between a satellite and radioterminals. FDD forward carriers and FDD return subcarriers may be dynamically coupled and decoupled to track changing return link communication bandwidth requirements and/or to avoid cochannel interference. The FDD forward carriers may have different reuse patterns than the FDD return subcarriers across a plurality of satellite spot beams.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A communications network comprising:
a resource manager that is configured to regulate carrier assignment for bidirectional wireless communications between a network component and a plurality of radioterminals, the carrier assignment regulation including selecting among a plurality of frequency division duplexing (FDD) return subcarriers within at least one FDD return carrier grouping for coupling to a selected one or more of a plurality of FDD forward carriers, and including controlling the network component to receive communications from a first one of the radioterminals on the selected FDD return subcarrier and to transmit communications to the radioterminals on the selected one or more FDD forward carriers, wherein the resource manager is further configured to dynamically couple and decouple particular ones of the FDD return subcarriers to particular ones of the FDD forward carriers in response to changing communication bandwidth requirements between the radioterminals and the network component and/or changes in prevailing interference conditions from the radioterminals; and wherein the resource manager is further configured to select a plurality of FDD return subcarriers from among FDD return subcarriers that are located within a plurality of different FDD return carrier groupings for coupling to a particular one of the FDD forward carriers for simultaneous bidirectional communications between the first radioterminal and the network component in response to communication bandwidth requirements from the first radioterminal or prevailing interference conditions from the first radioterminal, and the plurality of FDD return subcarriers that are coupled to the particular one of the FDD forward carriers reside in at least two different FDD return carrier groupings that are spaced apart in a defined frequency spectrum with at least one non-selected FDD return carrier grouping located therebetween, and the plurality of FDD return subcarriers coupled to the particular one of the FDD forward carriers are used at a same time for return communications from the first radioterminal to the network component while forward communications from the network component to at least some the radioterminals, including the first radioterminal, are occurring using the particular one of the FDD forward carriers.

2. The communications network of claim 1, wherein:
the resource manager is further configured to control the network component to selectively couple each of a plurality of selected FDD forward carriers to a variable number of selected FDD return subcarriers to provide bidirectional communications between the network component and a plurality of the radioterminals.

3. The communications network of claim 2, wherein:
at least some of the FDD forward carriers are coupled with a different number of the FDD return subcarriers.

4. The communications network of claim 1, wherein:
the resource manager is further configured to selectively couple more FDD return subcarriers to the particular one of the FDD forward carriers in response to at least a threshold increase in communication traffic to the network component from radioterminals that are assigned to receive communications from the network component through the particular one of the FDD forward carriers.

5. The communications network of claim 4, wherein:
the resource manager is further configured to separately decouple selected ones of the FDD return subcarriers from the particular one of the FDD forward carriers in response to at least a threshold decrease in communication traffic to the network component from radioterminals that are assigned to receive communications from the network component through the particular one of the FDD forward carriers.

6. The communications network of claim 1, wherein:
the resource manager is further configured to regulate a number of FDD return subcarriers that are assigned to a particular radioterminal in response to a bandwidth requirement for communications from the particular radioterminal to the network component.

7. The communications network of claim 6, wherein:
the resource manager is further configured to select the number of FDD return subcarriers that are assigned to the particular radioterminal from among a plurality of different FDD return carrier groupings.

8. The communications network of claim 6, wherein:
the resource manager is further configured to dynamically vary a number of FDD return subcarriers that are assigned to the particular radioterminal in response to changing requirements for communication bandwidth from the particular radioterminal and/or changes in the prevailing interference conditions from the particular radioterminal.

9. The communications network of claim 1, wherein:
the resource manager is further configured to respond to an increased communication bandwidth requirement of the first radioterminal assigned to receive network component communications through a first FDD forward carrier by decoupling a first FDD return subcarrier within a first FDD return carrier grouping from a second FDD forward carrier so that it is not available for use by radioterminals that are assigned to receive communications through the second FDD forward carrier, and by coupling the first FDD return subcarrier to the first FDD forward carrier for use by the first radioterminal.

10. The communications network of claim 9, wherein:
the resource manager is further configured to respond to an increased communication bandwidth requirement of a second radioterminal assigned to receive network component communications through the first FDD forward carrier by decoupling a second FDD return subcarrier within a second FDD return carrier grouping from the second FDD forward carrier so that it is not available for use by radioterminals that are assigned to receive communications through the second FDD forward carrier, and by coupling the second FDD return subcarrier to the first FDD forward carrier for use by the second radioterminal.

11. The communications network of claim 1, wherein:
the resource manager is further configured to dynamically remove and add back particular ones of the FDD return subcarriers from a set of the FDD return subcarriers that is available for selective coupling to the plurality of FDD forward carriers in response to a determination of levels of interference present in the frequency ranges of the particular ones of the FDD return subcarriers.

12. The communications network of claim 11, wherein:
the resource manager is further configured to remove a first FDD return subcarrier from a first FDD return carrier grouping from the set of the FDD return subcarriers that are available for selective coupling to the plurality of FDD forward carriers in response to a determination that at least a threshold level of interference is present in the first FDD return subcarrier, and to return the first FDD return subcarrier back to the set of the FDD return subcarriers that are available for selective coupling to the plurality of FDD forward carriers in response to a determination that less than the threshold level of interference is present in the frequency range of the first FDD return subcarrier.

13. The communications network of claim 12, wherein:
the resource manager is further configured to add a second FDD return subcarrier from a second FDD return carrier grouping to the set of the FDD return subcarriers that are available for selective coupling to the plurality of FDD forward carriers in response to the removal of the first FDD return subcarrier.

14. The communications network of claim 11, wherein:
the resource manager is configured to control the network component to cease coupling particular ones of the FDD return subcarriers that are within a first FDD return carrier grouping to a first FDD forward carrier while continuing to couple other ones of the FDD return subcarriers within the first FDD return carrier grouping to the first FDD forward carrier for bidirectional communications between the network component and the radioterminals.

15. The communications network of claim 1, wherein:
the resource manager is configured to selectively couple each of the FDD forward carriers with a variable number of the FDD return subcarriers within a same FDD return carrier grouping.

16. The communications network of claim 1, wherein:
the resource manager is configured to selectively couple one of the FDD forward carriers to a plurality of the FDD return subcarriers that are located within a plurality of different FDD return carrier groupings.

17. The communications network of claim 1, wherein:
each of the FDD forward carriers have the same frequency bandwidth as each of the FDD return carrier groupings.

18. The communications network of claim 17, wherein:
each of the FDD forward carriers have a 1.25 MHz frequency bandwidth and each of the FDD return carrier groupings have a 1.25 MHz frequency bandwidth.

19. The communications network of claim 18, wherein:
the FDD return subcarriers comprise a plurality of wideband and narrowband radio bearers, comprising a plurality of radio access technologies.

20. The communications network of claim 19, wherein:
the narrowband radio bearers include Frequency Division Multiple Access (FDMA) radio access technology, with bandwidths of 6.4 kHz and 12.8 kHz, and the wideband radio bearer includes EVDO (EVolution-Data Optimized) radio access technology with 1.25 MHz bandwidth.

21. The communications network of claim 1, wherein:
the resource manager resides in a space based component of the communications network.

22. The communications network of claim 1, wherein:
the resource manager resides in terrestrial based infrastructure connected to a ground station.

23. A communications network comprising:
a resource manager that is configured to regulate assignment of frequency division duplexing (FDD) forward carriers and FDD return carriers operated by a network component to provide a plurality of service areas for bidirectional communications with radioterminals, wherein the FDD forward carriers have different reuse patterns than the FDD return carriers across the plurality of service areas,
wherein at least some of the FDD return carriers comprise FDD return carrier groupings, each of the FDD return carrier groupings comprise a plurality of FDD return subcarriers;
the resource manager is further configured to dynamically couple and decouple particular ones of the FDD return subcarriers to particular ones of the FDD forward carriers in response to changing communication bandwidth requirements from the radioterminals and/or changes in prevailing interference conditions from the radioterminals; and
the resource manager is further configured to select a plurality of FDD return subcarriers from among FDD return subcarriers that are located within a plurality of different FDD return carrier groupings for coupling to a particular one of the FDD forward carriers for simultaneous bidirectional communications between a first one of the radioterminals and the network component in response to communication bandwidth requirements from the first radioterminal or prevailing interference conditions from the first radioterminal, and the plurality of FDD return subcarriers that are coupled to the particular one of the FDD forward carriers reside in at least two different FDD return carrier groupings that are spaced apart in a defined frequency spectrum with at least one non-selected FDD return carrier grouping located therebetween, and the plurality of FDD return subcarriers coupled to the particular one of the FDD forward carriers are used at a same time for return communications from the first radioterminal to the network component while forward communications from the network component to at least some the radioterminals, including the first radioterminal, are occurring using the particular one of the FDD forward carriers.

24. The communications network of claim 23, wherein:
the resource manager is configured to regulate assignment of frequency division duplexing (FDD) forward carriers and FDD return carriers operated by a space based component of the communications network to provide a plurality of spot beam service areas for bidirectional communications with radioterminals, wherein the FDD forward carriers have different reuse patterns than the FDD return carriers across the plurality of spot beam service areas.

25. The communications network of claim 23, wherein:
the resource manager is further configured to regulate the assignment to provide a higher frequency reuse factor for greater physical separation between reuse of FDD return carriers relative to reuse of FDD forward carriers.

26. The communications network of claim 23, wherein:
the resource manager is further configured to regulate the assignment to provide a uniform frequency reuse pattern for FDD forward carriers and a non-uniform frequency reuse pattern for FDD return carriers.

27. The communications network of claim 23, wherein:
the resource manager is further configured to control the network component to selectively couple each of at least some of the FDD forward carriers to a variable number of selected FDD return subcarriers that are used in different ones of the service areas.

28. The communications network of claim 23, wherein:
at least some of the service areas each have different numbers of FDD return subcarriers.

29. The communications network of claim 28, wherein:
the service areas each have the same number of FDD forward carriers.

30. The communications network of claim 23, wherein:
the resource manager is further configured to dynamically vary the frequency reuse pattern assigned for FDD return subcarriers in response to changing requirements for communication bandwidth from radioterminals to the network component.

31. The communications network of claim 30, wherein:
the resource manager is further configured to dynamically assign and deassign particular ones of the FDD return subcarriers to particular ones of the service areas in response to changing communication bandwidth requirements between the radioterminals and the network component.

32. The communications network of claim 31, wherein:
the resource manager is further configured to assign more FDD return subcarriers to a particular one of the service areas in response to at least a threshold increase in communication traffic to the network component from radioterminals within the particular one of the service areas.

33. The communications network of claim 31, wherein:
the resource manager is further configured to assign more FDD return subcarriers to a particular one of the service areas in response to at least a threshold increase in a number of radioterminals that are located within the particular one of the service areas and are registered to communicate with the network component providing the particular one of the service areas.

34. The communications network of claim 23, wherein:
the resource manager is further configured to dynamically vary the frequency reuse pattern assigned for FDD return subcarriers in response to determined levels of interference that are present in the frequency ranges of the FDD return subcarriers.

35. The communications network of claim 34, wherein:
the resource manager is further configured to dynamically assign and deassign particular ones of the FDD return subcarriers to particular ones of the service areas in response to changing levels of interference present in the frequency ranges of the particular ones of the FDD return subcarriers.

36. The communications network of claim 34, wherein:
the resource manager is further configured to remove a first FDD return subcarrier in a first FDD return carrier grouping from a set of the FDD return subcarriers that are available for selective assignment to a selected one of the service areas in response to a determination that at least a threshold level of interference is present in a frequency range of the first FDD return subcarrier, and to return the first FDD return subcarrier back to the set of the FDD return subcarriers that are available for selective assignment to the selected one of the service areas in response to a determination that less the threshold level of interference is present in the frequency range of the first FDD return subcarrier.

37. The communications network of claim 23, wherein:
each of the FDD forward carriers have the same frequency bandwidth as each of the FDD return carrier groupings.

38. The communications network of claim 37, wherein:
each of the FDD forward carriers have a 1.25 MHz frequency bandwidth and each of the FDD return carrier groupings have a 1.25 MHz frequency bandwidth.

39. The communications network of claim 38, wherein:
each of the FDD return subcarriers have a 6.4 kHz frequency bandwidth.

40. The communications network of claim 38, wherein:
each of the FDD return subcarriers have a 12.8 kHz frequency bandwidth.

41. The communications network of claim 23, wherein:
the resource manager resides in a space based component of the network component.

42. The communications network of claim 23, wherein:
the resource manager resides in terrestrial based infrastructure connected to a ground station.

* * * * *

UNITED STATES PATENT AND TRADEMARK OFFICE
CERTIFICATE OF CORRECTION

PATENT NO. : 8,520,561 B2
APPLICATION NO. : 12/699466
DATED : August 27, 2013
INVENTOR(S) : Nguyen et al.

It is certified that error appears in the above-identified patent and that said Letters Patent is hereby corrected as shown below:

On Title Page:
Page 3, Item [56] FOREIGN PATENT DOCUMENTS, column 2, Line 3:
   Please delete "EP 0 746 065 A2 12/1996"
     and insert -- EP 0 748 065 A2 12/1996 --

Signed and Sealed this
Twenty-ninth Day of April, 2014

Michelle K. Lee
*Deputy Director of the United States Patent and Trademark Office*